C. C. MEDBERY.
AEROPLANE.
APPLICATION FILED FEB. 28, 1919.
1,393,150.
Patented Oct. 11, 1921.
2 SHEETS—SHEET 1.
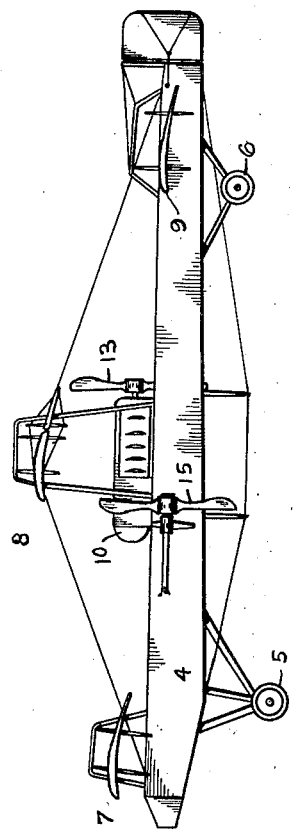
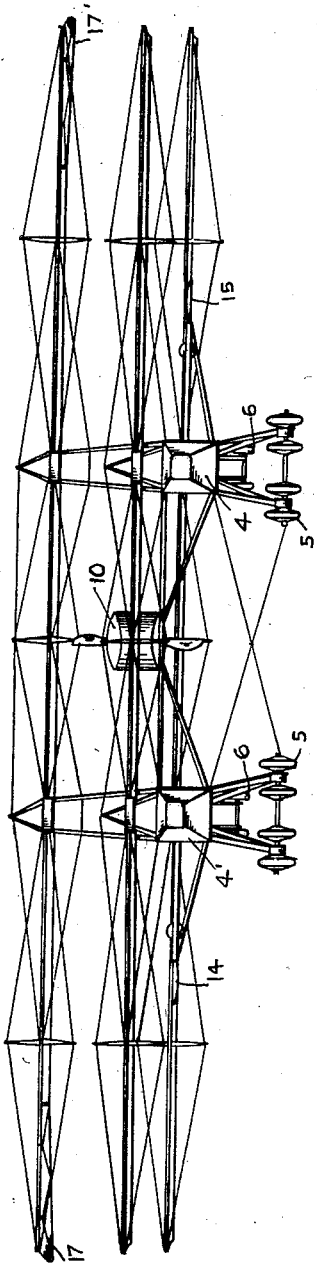
Inventor
Chauncey C. Medbery.
By his Attorney.

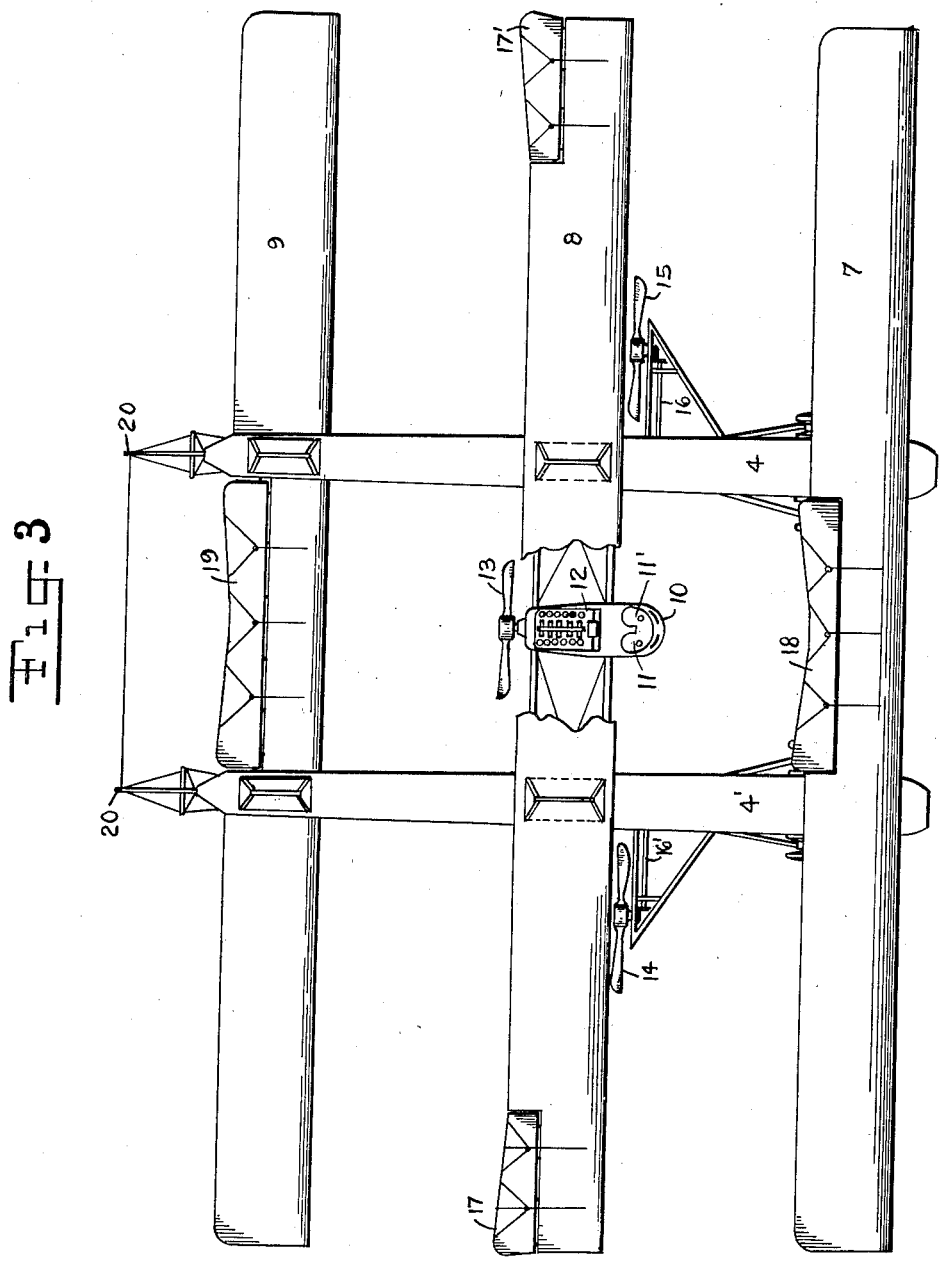

UNITED STATES PATENT OFFICE.

CHAUNCEY C. MEDBERY, OF NEW YORK, N. Y.

AEROPLANE.

1,393,150. Specification of Letters Patent. Patented Oct. 11, 1921.

Application filed February 28, 1919. Serial No. 279,925.

*To all whom it may concern:*

Be it known that I, CHAUNCEY C. MEDBERY, a citizen of the United States, residing at New York city, in the county of New York and State of New York, have invented certain new and useful Improvements in Aeroplanes, of which the following is a specification, reference being had therein to the accompanying drawing.

My invention relates to improvements in aeroplanes and more particularly has particular reference to the construction and arrangement of the supporting surfaces and the positioning of the center of gravity with reference to the center of structure. It has heretofore been the practice to provide for the center of gravity and center of pressure at the same place in the machine, but according to my preferred form of construction the center of gravity is at the center of the structure beneath the middle wing and the center of pressure of the aerofoils are preferably at both ends and at the center of the structure, thus giving a three-point equal suspension and equalizing the center of pressure throughout the entire structure or fuselage. By locating the center of gravity at the center of the structure and the centers of pressure of the aerofoils distributed at both ends and at the center I secure a cantileverage action aided by the bridge construction of bracing from both ends to the center of the structure. The center of gravity being placed in the center of the structure enables far greater control as functioning from both ends toward the center using the center of the machine as the fulcrum from which all leverage action takes place and by the three-point suspension a cantileverage action of the centers of pressure, a distribution of weight throughout the entire machine is obtained and this weight is automatically distributed to the three-points of pressure.

The stability of the machine is inherent owing to the location of the wing surface upon the structure, the center of lift or pressure being at all times above the center of balance, irrespective of flying position. Through the center of gravity being located at the center of the structure, the landing of very heavy machines is made practical by the distribution of weight throughout the machine, rather than as in the present type where the total weight, center of pressure, and gravity are located just over the landing gear.

The wing surfaces are so placed upon the body of the machine as to encounter undisturbed air at all times in all positions, by which the total efficiency of the wing surface is insured. In landing the wing surfaces equalize the weight through the distribution of pressure as maintained on these surfaces so long as the machine is in action. The center of gravity being located at the center of the structure with the landing gears removed to the ends of the structure and the same amount of pressure or lift exerted over both the landing gears forward and aft, as well as over the center of gravity, permits of landing without shock by the reduction in speed at which the machine comes in contact with the ground. The general construction of the body of the machine and the position of the center wing, enables the bracing of the structure in a manner that insures both rigidity and at the same time flexibility, and follows the best structural design in cantileverage as applied to bridge construction.

By the distribution of the center of pressure and the cantileverage effect obtained therefrom, the machine in rough or choppy air such as is encountered over mountains and valleys, permits of a steadiness comparable to the ocean liner covering three waves, while the present type of machine, with the center of gravity and pressure in one, choppy air or adverse currents are not only dangerous but the machine becomes difficult to control. These currents act upon the machine as a heavy sea upon a small boat. The foregoing illustrates an important feature in my preferred construction as applied to commercial aviation and the carrying of passengers as compared with the present type of aeroplane.

By centralizing the support of structure at the location of the center of gravity, and the controls functioning from both ends of this center, the dangers of side slip, nose dive, and tail spins are automatically removed and can only be accomplished by the use of the controls.

Referring now more particularly to the accompanying drawings I have illustrated in Figure 1 in side elevation, a suitable type of aircraft or aeroplane of triplane type embodying an application of my invention. Fig. 2 is a front elevation and Fig. 3 a plan view.

4—4' indicate the fuselage supported upon the fore and aft wheels 5—6 respectively, and 7, 8, 9 indicate the aerofoils suitably mounted as shown. 10 indicates the housing for the operator, engine, etc., two seats 11—11' being shown for aviator and attendant in Fig. 3. 12 indicates the engine, and 13 the propeller thereof. 14—15 also indicate additional propellers which may be suitably driven from the engine 12 by any suitable means such as the transmission 16—16'. The ailerons 17—17' are preferably secured at the rearward portion of the lateral extremities of the central aerofoil 8 as shown and elevator surfaces such as 18—19 are preferably provided at the rear central zone of the fore and aft aerofoils 7—9 respectively as shown, the rudders 20—20' being preferably mounted at the ends of the fuselage and connected as shown.

Of course it will be understood that various modifications may be made in the construction and arrangement of parts without departing from the spirit of the invention as claimed.

I claim:

1. In a machine of the class described, fore and aft aerofoils and a substantially midway intermediate aerofoil above said fore and aft aerofoils, said fore and aft aerofoils being distanced longitudinally from said intermediate aerofoil greater than the depth of any of said aerofoils, all of said aerofoils of substantially the same length laterally, and in combination with said intermediate aerofoil, ailerons at the lateral margins thereof, and movable portions at about mid-sections of said fore and aft aerofoils.

2. In a machine of the class described, fore and aft aerofoils and a substantially midway intermediate aerofoil above said fore and aft aerofoils, said fore and aft aerofoils being distanced longitudinally from said intermediate aerofoil greater than the depth of any of said aerofoils, all of said aerofoils of substantially the same length laterally, and in combination with said intermediate aerofoil, ailerons at the lateral margins thereof, stabilizers at about mid-sections of said fore and aft aerofoils, and a pair of parallel fuselages each of which are inward from the aerofoil tips a distance about equal to the distance of their separation.

In testimony whereof I hereunto affix my signature in the presence of two witnesses.

CHAUNCEY C. MEDBERY.

Witnesses:
ANNA F. DUFFY,
DAVID H. DOUGLASS.